United States Patent [19]
Cocca

[11] Patent Number: 5,659,830
[45] Date of Patent: Aug. 19, 1997

[54] APPARATUS FOR DISCRIMINATING BETWEEN A FILM NOTCH AND METERING PERFORATIONS IN AN AUTOMATIC CAMERA

[75] Inventor: J. David Cocca, Pittsford, N.Y.

[73] Assignee: Eastman Kodak Company, Rochester, N.Y.

[21] Appl. No.: 621,301

[22] Filed: Mar. 22, 1996

[51] Int. Cl.⁶ .................. G03B 1/18; G03B 1/00; G03B 7/00
[52] U.S. Cl. .................. 396/392; 396/395; 396/406; 396/408
[58] Field of Search ............... 354/173.1, 173.11, 354/213, 215, 217, 218, 206, 203, 21, 412; 396/392, 395, 406, 408, 516

[56] References Cited

U.S. PATENT DOCUMENTS

| | | | |
|---|---|---|---|
| 4,295,713 | 10/1981 | Edwards | 352/235 |
| 4,334,753 | 6/1982 | Harvey | 354/289 |
| 4,373,796 | 2/1983 | Matsuura et al. | 354/173 |
| 4,420,236 | 12/1983 | Taniguchi et al. | 354/21 |
| 4,588,272 | 5/1986 | Hoda et al. | 354/21 |
| 4,721,973 | 1/1988 | Harvey | 354/215 |
| 4,779,111 | 10/1988 | Ogawa et al. | 354/173.11 |
| 4,864,332 | 9/1989 | Harvey | 354/21 |
| 4,914,462 | 4/1990 | Pagano | 354/213 |
| 4,939,531 | 7/1990 | Sawamura et al. | 354/173.1 |
| 4,994,833 | 2/1991 | Cocca | 354/207 |
| 5,023,642 | 6/1991 | Pagano | 354/21 |
| 5,032,854 | 7/1991 | Smart et al. | 354/273 |
| 5,032,858 | 7/1991 | Kobayashi et al. | 354/173.1 |
| 5,136,314 | 8/1992 | Kazami et al. | 354/173.1 |
| 5,166,715 | 11/1992 | Labaziewicz | 354/173.1 |
| 5,260,740 | 11/1993 | Seto | 355/50 |
| 5,479,226 | 12/1995 | Kazami et al. | 354/21 |
| 5,481,331 | 1/1996 | Cocca et al. | 354/412 |

*Primary Examiner*—Safet Metjahic
*Assistant Examiner*—Michael Dalakis
*Attorney, Agent, or Firm*—Edward Dugas; Francis H. Boos, Jr.

[57] ABSTRACT

Apparatus for use in an automatic film winding camera for determining, during film loading, the presence of a film leader portion having a notch therein. First and second film perforation sensors positioned apart along a film advancing path of the film in first and second sensor positions are enabled and disabled in a sequence in which the first and second sensors successively detect the advancement of the film's leading edge at the first and the second sensor positions. The first sensor is then enabled for sensing the film perforations when the notch in the film leader portion is positioned between the first and second sensor positions.

5 Claims, 4 Drawing Sheets

APPARATUS FOR DISCRIMINATING BETWEEN A FILM NOTCH AND METERING PERFORATIONS IN AN AUTOMATIC CAMERA

FIELD OF THE INVENTION

The invention relates generally to the field of automatic film loading cameras, and in particular to an apparatus for determining if the film has been properly loaded into the camera.

BACKGROUND OF THE INVENTION

Traditionally strips of film have been wound into a light tight cartridge with a film leader portion sticking out to facilitate either manual or automatic loading onto a take up spool. Activation of the camera's picture taking mechanism in some cameras has been delayed by first sensing the existence of the film's leader portion which is designed with a width that is less than the width of the film strip. The delay being maintained until the camera detected a transition between the narrow leader portion and the wider film portion of the film strip. One prior art arrangement used different sized indicia in the leader portion than in the film portion of the film strip. Activation of the camera's picture taking was delayed until a size change in indicia was noted indicating that the film had been properly loaded and advanced. Another type of film cartridge, not presently in wide spread use, does not require the use of a take up spool or operator intervention to advance the film from the cartridge. With this type of cartridge the film strip is thrust out along a film path when the film cartridge is inserted in the camera. A notch is provided at the beginning of the leader portion 16 as shown in FIG. 1 as 22. That notch 22 is on the same side of the film strip 14 as the indicia 24A and 24B. The dimensions of the notch 22 and indicia 24A and 24B are such that it is not possible to distinguish between the two using a standard optical sensor arrangement. One simple method that has been tried is to set a time delay after the leader portion of the film has been detected. During the delay, the optical sensor is turned "off" so that a false signal from the notch will not be detected. After the delay, the optical sensor is turned back "on" again and monitoring for the first anticipation perforation begins. The problem with this method is that film travel, on thrust, may vary greatly due to external conditions such as individual cartridge characteristics, interference with a magnetic head (for those cameras that utilize film having magnetic strips or other indicia), temperature, battery conditions, etc. Therefore, setting an appropriate delay may not always be reliable. As a result some other means of either detecting or ignoring the notch is necessary. The present invention directs itself to an apparatus for solving this problem.

SUMMARY OF THE INVENTION

The present invention is directed to overcoming one or more of the problems set forth above. Briefly summarized, according to one aspect of the present invention there is provided an apparatus for use in an automatic film winding camera for determining the presence of a film leader portion having a notch therein being advanced along a path from a film cartridge correctly and the enablement of film perforation sensing, comprising:

a first and a second sensor positioned apart along the path of the film at a first and a second sensor position, respectively;

means for advancing the film from the cartridge; and means for enabling and disabling said first and second sensors so as to detect the advancement of the film's leading edge at the first and the second sensor positions and to enable the first sensor for sensing film indicia when the notch in the film leader portion is positioned between the first and the second sensor position.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of assuring that the leader portion of a strip of film has been advanced correctly to a position that assures that the next detected (sensed) indicia are film perforations.

DETAILED DESCRIPTION OF THE INVENTION

Figure 1:
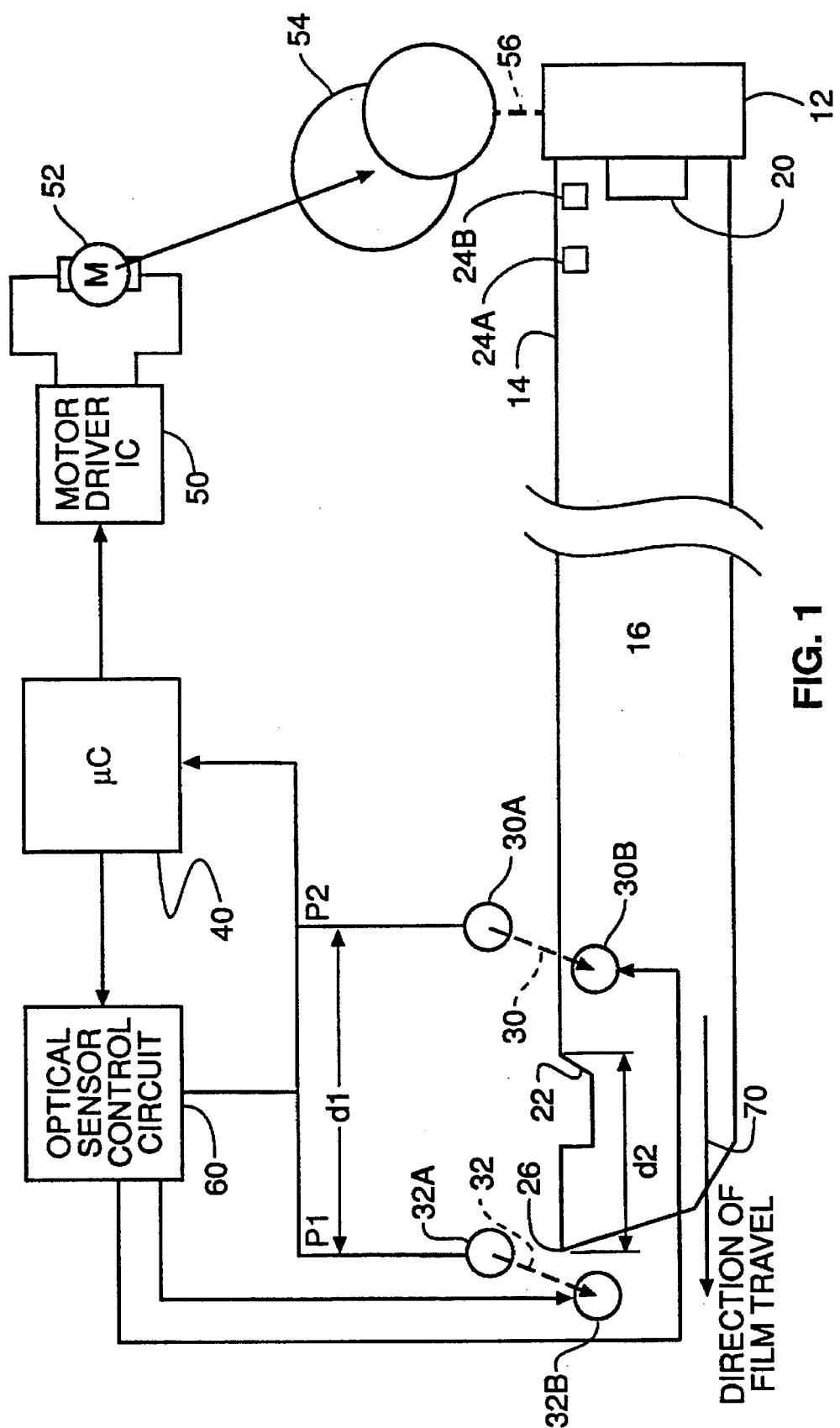
FIG. 1 is a block diagram of a preferred arrangement of the inventive apparatus.

Referring to FIG. 1, the apparatus of the present invention utilizes a film cartridge 12 of the type that houses a film strip 14 which is provided with a leader portion 16. In an initial position, after the cartridge is loaded, the film leader portion 16 is within the cartridge. To commence feeding of the film into the camera a transport motor 52, through a gear train 54, and connecting shaft 56, causes the spool (not shown for purposes of clarity) on which the film strip 14 is mounted to thrust the leader portion 16 from the cartridge in the direction of film travel indicated by the arrow 70. The film strip 14, following the leader portion 16, contains the standard photosensitive frames of image capturing material 20 and indicia 24A and 24B, which generally are perforations positioned along one edge of the film. The indicia are used to advance the film and to correctly position the image frames 20 within the camera's image gate. To determine if the leader portion 16 has been advanced properly, sensors 30 and 32 are located at positions P2 and P1, respectively, on each side of the leader portion 16 and film strip 14 in line with the indicia 24A, 24B. The sensors 30 and 32 may take the form of LED's 30A and 32A and photosensors 30B and 32B positioned to detect the light from the LED's 30A and 32A when not interrupted by the leader portion 16 of the film strip 14. The sensors 30 and 32 are positioned at a distance d1 from each other. Other forms of sensors may be substituted for sensors 30 and 32 including non-light generating sensors without detracting from the invention. The leader portion 16 is provided with a notch 22 that ends a distance d2 from its most extended edge 26. In the preferred embodiment of the invention, d1 is always greater than d2. In the design of certain film cartridges 12, particularly of the type that allows film to be thrust from the cartridge for automatic film loading, it has been useful to use the notch 22 for proper film handling. For a more thorough explanation of the purpose of the notch 22, see U.S. Pat. No. 4,994,833, entitled "Camera Apparatus For Protecting Double-Exposure Of Film Returned To A Self-Thrusting Cassette" by the inventor of the present application with both application and patent being assigned to Eastman Kodak Company. The teachings of the U.S. Pat. No. 4,994,833 patent are incorporated by reference as if set forth in full herein. By necessity the notch 22 is positioned on the same edge of the film as the indicia (perforations) 24 and from a sensor point of view is difficult to distinguish from a perforation.

Output signals from the detectors 30B and 32B are directed to a microcontroller 40 and to an optical sensor control circuit 60. Although a microcontroller 40 is used in the preferred enabling embodiment of the invention other forms of controllers, such as a microprocessor, computer, or IC logic, may be used without detracting from the invention or requiring undue experimentation. The optical sensor control circuit 60 is used to selectively energize the LED's 30A and 32A and to adjust the gain of the photosensors 30B and 32B. The operation of the gain adjustment is described in more detail in a Research Disclosure 36705 published November 1994 entitled "Control System For Camera With Multiple Opto-Sensors" by Anonymous. The teachings of the Research Disclosure are incorporated by reference herein as if set forth in full. The microcontroller 40 also provides a motor drive signal to the motor driver IC 50 to cause the transport motor 52 to rewind the film, thrust the leader portion 16 outward from the cartridge, or advance the film in accordance with the point in time of the camera's operating cycle. The gear train 54 is also used to connect the transport motor 52 to a film take up spool to advance the film from the cartridge. The operation of this gearing mechanism is more clearly described in U.S. Pat. No. 4,994,833.

Figure 2:
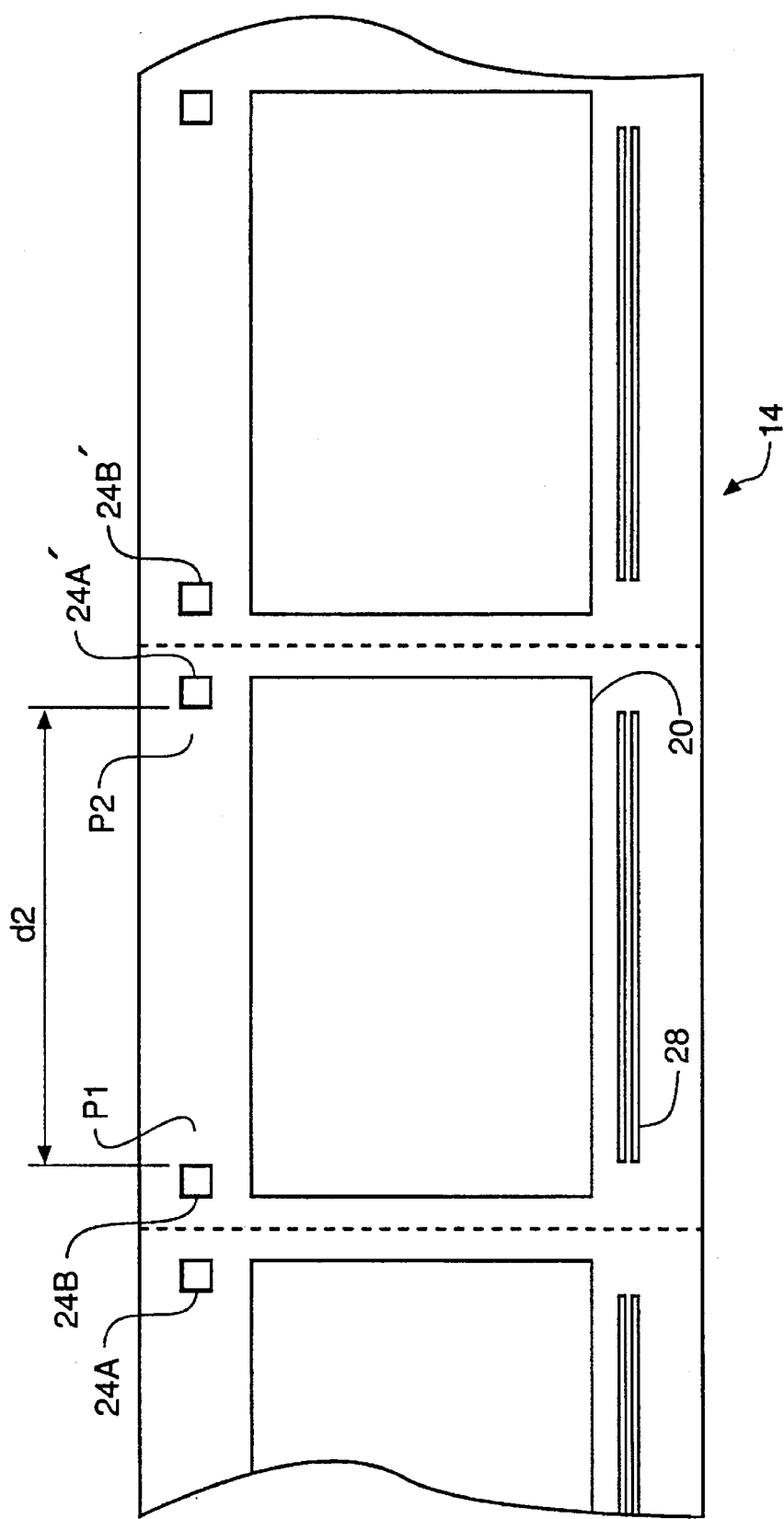
FIG. 2 is an enlarged view of a piece of film strip of the type used with the present invention.

Referring to FIG. 2, the film strip 14 is enlarged for clarity to show that each successive frame of image capturing material 20 is referenced with successive pairs of indicia 24A; 24B and 24B. These indicia, when sensed, provide the indexing for determining the positioning of the frames of image capturing material 20 within the camera. Additionally, each film strip 14 is provided with strips of magnetic recording material 28 for storing camera and picture taking data. The sensor positions P1 and P2 are shown separated by the distance d1 with d1 being less than the distance between the indicia 24B and 24A'.

Figure 3A:
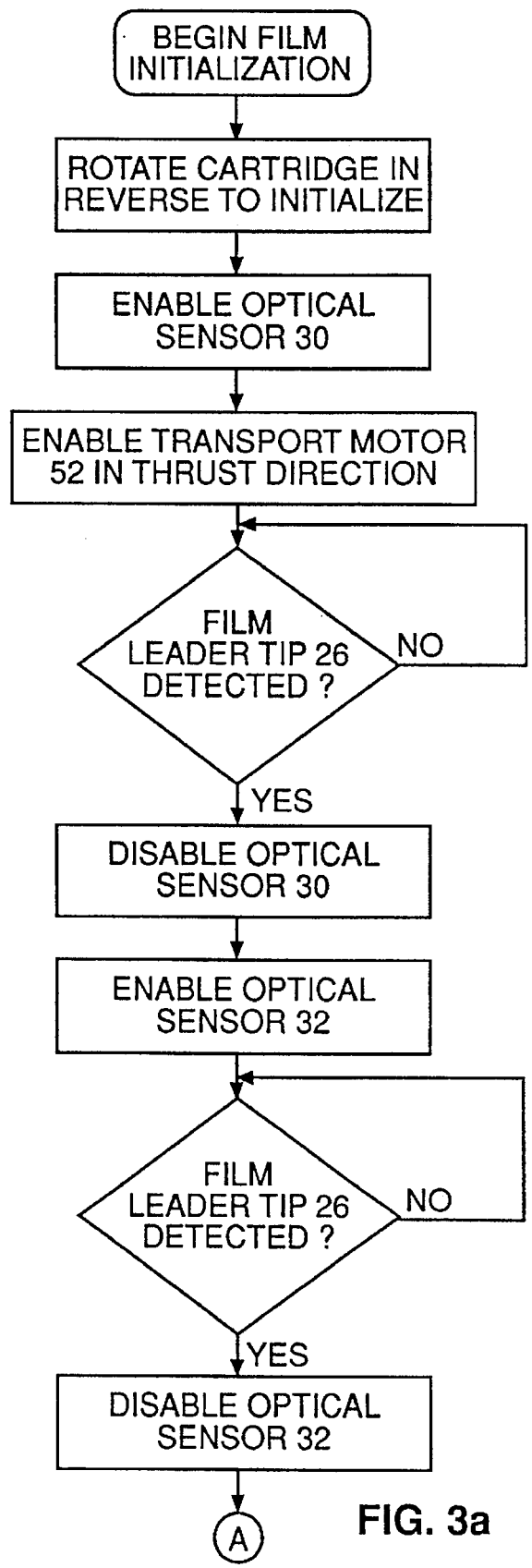
FIGS. 3A and 3B are flow charts illustrating the operating steps of the preferred apparatus.
Figure 3B:
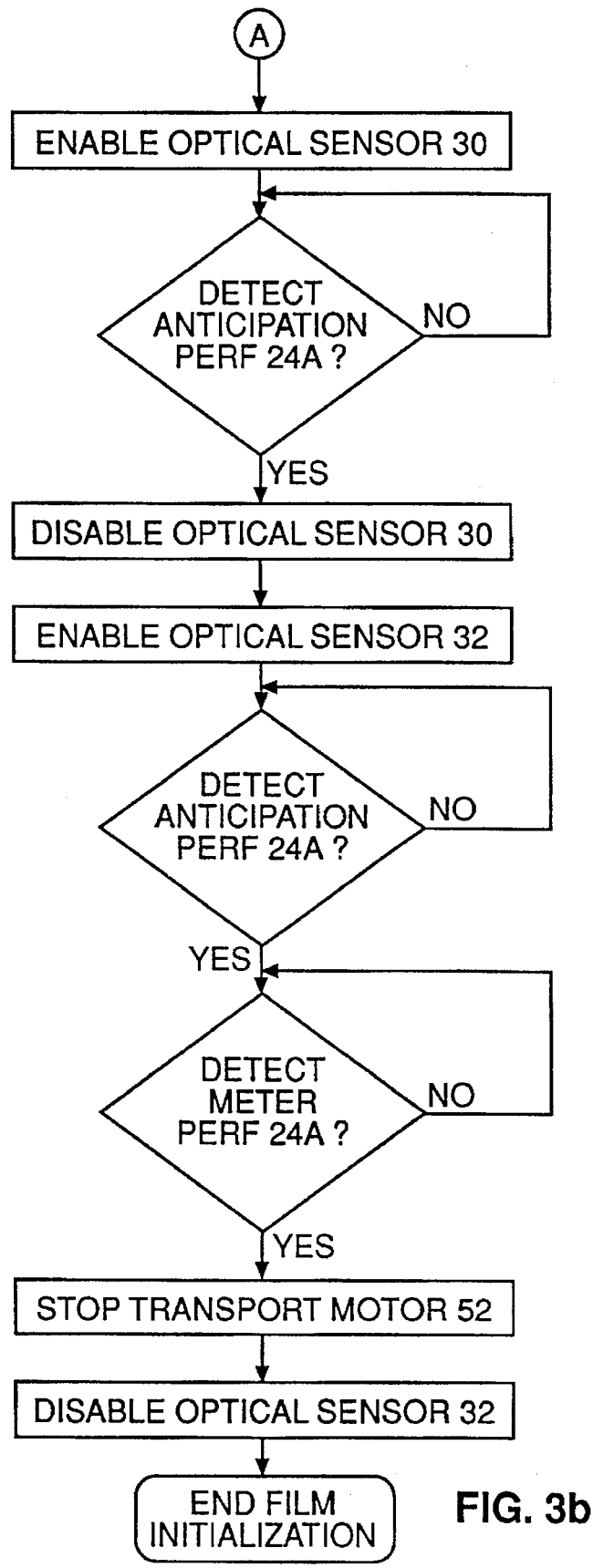

Referring to FIGS. 3A and 3B, a film initialization cycle 100 begins by rewinding the film into the cartridge, if it is out of the cartridge or by rotating the film within the cartridge, if it is not out of the cartridge. The next step 102 is to enable the optical sensor 30 "on" to sense the film's leading edge 26 if the leader portion 16 is advancing properly from the film cartridge 12. The transport motor 52 is then energized at step 104 to controllably thrust the film leader portion 16 from the cartridge. When the film's leading edge 26 is sensed at step 106 by sensor 30 it is turned "off" at step 108 and the optical sensor 32 is turned "on" at step 110. The sensor 32 will then sense the film's leading edge 26, again assuming proper leader portion 16 advancement. At this point, as determined at step 112 the notch 22 is between sensors 30 and 32. The sensor 32 is now turned "off" at step 114 and the sensor 30 is turned "on" at step 116. When the sensor 30 "sees" the anticipation perforation 24A, as determined at step 118 the notch 22 is long past sensor 32. Then the sensor 30 is turned "off" at step 120 and the sensor 32 is turned "on" at step 122. The optical sensor 32 is then used to sense the perforation 24A at step 124 and the perforation 24B at step 126 as the film is advanced to its first picture taking position. In that position the transport motor 52 is stopped at step 128 and the optical sensor 32 is turned "off" at step 130 thereby ending the film initialization cycle.

The invention has been described with reference to a preferred embodiment. However, it will be appreciated that variations and modifications can be effected by a person of ordinary skill in the art without departing from the scope of the invention.

| Parts List: | |
|---|---|
| 12 | film cartridge |
| 14 | film strip |
| 16 | leader portion |
| 20 | image capturing material (image frames) |
| 22 | notch |
| 24A, 24B, 24A', 24B' | perforations |
| 26 | film's leading edge |
| 28 | magnetic recording material |
| 30, 32 | sensors |
| 30A, 32A | LED's |
| 30B, 32B | photosensors |
| 40 | microcontroller |
| 50 | motor driver IC |
| 52 | transport motor |
| 54 | gear train |
| 56 | connecting shaft |
| 60 | optical sensor control circuit |
| 70 | indicates direction of film travel |

I claim:

1. An apparatus for use in an automatic film winding camera for determining the presence of a film leader portion having a notch therein being advanced outwardly along a path from a film cartridge correctly with provision for enablement of film perforation sensing, comprising:

a first and a second film perforation sensor positioned apart along the path of the film at a first and a second sensor position, respectively;

means for advancing the film outwardly from the cartridge; and means for enabling and then disabling at least the first of said first and second sensors so as to detect the advancement of the film's leading edge at the first and the second sensor positions and to enable the first sensor for sensing film indicia when the notch in the film's leader portion is positioned between the first and the second sensor position.

2. The apparatus according to claim 1, wherein the distance between said first and said second detector is greater than the distance between the notch and the film's leading edge.

3. The apparatus according to claim 1 and further comprising:

gain means connected to said first and said second sensors for controlling the gain of the sensors.

4. The apparatus according to claim 1 and further comprising:

microcontroller means connected between said first and second sensors for controlling said means for advancing so as to advance said film from said film cartridge in accordance with sensed film indicia.

5. An apparatus for use in an automatic film winding camera adapted to accept a film cartridge containing a film strip having image capturing material, a leader portion and indicia at predetermined locations along at least one edge of the film strip, said apparatus determining the presence of the film's leader portion being thrust outwardly correctly from the film cartridge to an initial position and the apparatus having provision for enabling an indicia sensor, comprising:

first indicia sensor means initially being enabled for determining the presence of the edge of a film leader portion at a first thrusting position and thereafter being disabled;

second indicia sensor means being enabled for determining the presence of the edge of a film's leader portion at a second thrusting position; and said first and second means being enabled, for sensing film strip indicia, after determinations that the edge of the film leader portion has passed both the first and second thrusting positions.

* * * * *

UNITED STATES PATENT AND TRADEMARK OFFICE
CERTIFICATE OF CORRECTION

PATENT NO. : 5,659,830
DATED : August 19, 1997
INVENTOR(S) : J. David Cocca

It is certified that error appears in the above-identified patent and that said Letters Patent is hereby corrected as shown below:

On the title page, insert the following'

--[60] Provisional application No. 60/002,892, filed 29 August 1995--

Column 1, line 5, insert the following:

CROSS REFERENCE TO RELATED APPLICATION; Reference is made to and priority claimed from U.S. Provisional Application Serial No. 60/002,892, filed 29 August 1995, entitled APPARATUS FOR DISCRIMINATING BETWEEN A FILM NOTCH AND METERING PERFORATIONS IN AN AUTOMATIC CAMERA--

Signed and Sealed this

Twenty-fourth Day of February, 1998

Attest:

BRUCE LEHMAN

Attesting Officer        Commissioner of Patents and Trademarks